J. M. WHEELER.
Improvement in Car-Couplings.
No. 131,416.  Patented Sep. 17, 1872.
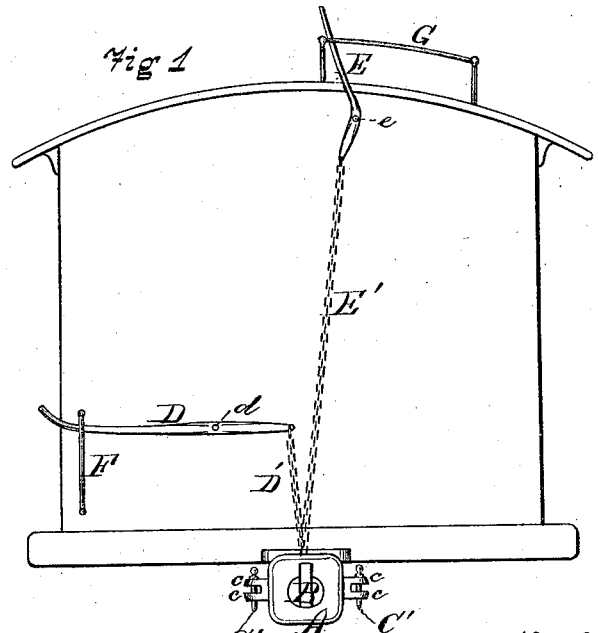
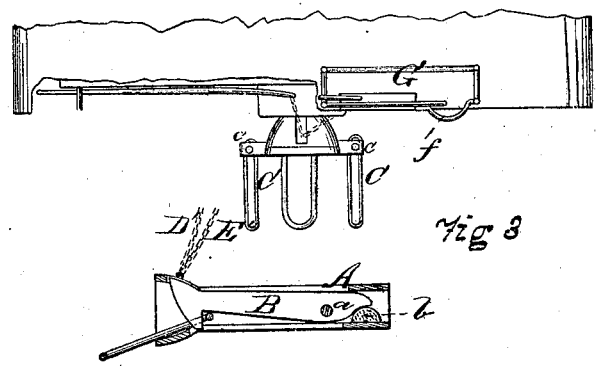
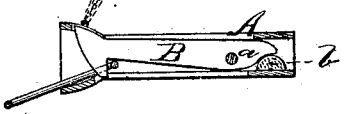

UNITED STATES PATENT OFFICE.

JOHN M. WHEELER, OF AFTON, IOWA.

IMPROVEMENT IN CAR-COUPLINGS.

Specification forming part of Letters Patent No. 131,416, dated September 17, 1872.

*To all whom it may concern:*

Be it known that I, JOHN M. WHEELER, residing at Afton, in the county of Union and State of Iowa, have invented a certain Improvement in Car-Couplings, of which the following is a specification:

The nature of this invention consists in the use, in connection with a car-coupling such as is described in the Letters Patent granted to J. M. Wheeler and C. W. Chase October 19, 1869, of two gravitating levers and their guards, one lever and guard being disposed upon the end of the car so as to be in convenient position for operation from the ground upon one side of the car, and the other lever and guard being located on top of the car. The short arms of the levers are connected, respectively, to the coupling-hook by means of chains, and the guards and levers are so constructed and arranged that each of the latter may release the other from the catch of its guard, as will be more specifically explained in the ensuing description.

Figure 1 represents an end view of the body of a car to which my novel devices are attached. Fig. 2 is a top view. Fig. 3 is a longitudinal section of the draw-head. Fig. 4 is a view of one of the guards for the levers.

The same letters of reference are employed in all the figures in the designation of identical parts.

The buffer or draw-head A contains a coupling-hook, B, which is pivoted at $a$, and bears with its rear end upon a spring, $b$, which causes its forward hooked end to be depressed to hold the link. The top of the draw-head is provided with a slot, through which the hook B plays when it is elevated for the purpose of releasing the link. Upon each side of the flaring mouth of the draw-head two laterally-projecting lugs, $c\ c$, are formed, one above the other, with an intervening space of sufficient height to receive an additional link, C, which is secured by a pin, C', passing vertically through eyes in the lugs. For the purpose of lifting the hook B to release the link and uncouple cars both from the side of a car and from the top thereof, two levers, D and E, are employed, their short arms being connected by chains D' and E' to the forward end of the hook B. The lever D is fulcrumed at $d$, and extends outward to the side of the car, passing through a guard, F, of the form best seen in Fig. 4, having a hook or catch at $f$ for locking the lever to hold the coupling-hook in an elevated position. The lever E, turning on a fulcrum at $e$ near the top of the car, passes upward through the guard G, which is constructed like the guard F, but is arranged in a horizontal position while the latter stands vertically. The tension of the spring $b$, acting through the coupling-hook and chains upon the short arms of the levers, retains the long arms in the catches of their guards when once locked therein; but the levers are so disposed that when one of them is drawn back or borne down to release it from the catch, the other one, being relieved from the action of the spring $b$, gravitates so as to fall automatically out of the catch of its guard. Both levers being thus released from their catches the coupling-hook is in condition to automatically couple onto the entering-link of an approaching car. The ends of the catches are so made as to impart to the levers a lateral motion in escaping therefrom, so that they may not be caught again as they are moved in the guard.

I do not claim broadly the use of two connected levers or rods, one for operating the coupling-hook from the side of the car and the other for operating the said hook from the top of the car; being aware that this, broadly, is not new.

What I claim as my invention, and desire to secure by Letters Patent, is—

The combination of the coupling-hook B, chains D' and E', gravitating and self-releasing levers D and E, and guards F $f$ and G $f$, all constructed and arranged substantially as and for the purpose specified.

In testimony whereof I have signed my name to this specification in the presence of two subscribing witnesses.

J. M. WHEELER.

Witnesses:
FORDYCE J. NYE,
J. M. MILLIGAN.